March 2, 1937.　　　E. H. ANDERSON　　　2,072,787
TANDEM WHEEL CHASSIS UNIT
Filed Feb. 1, 1933　　　3 Sheets-Sheet 1
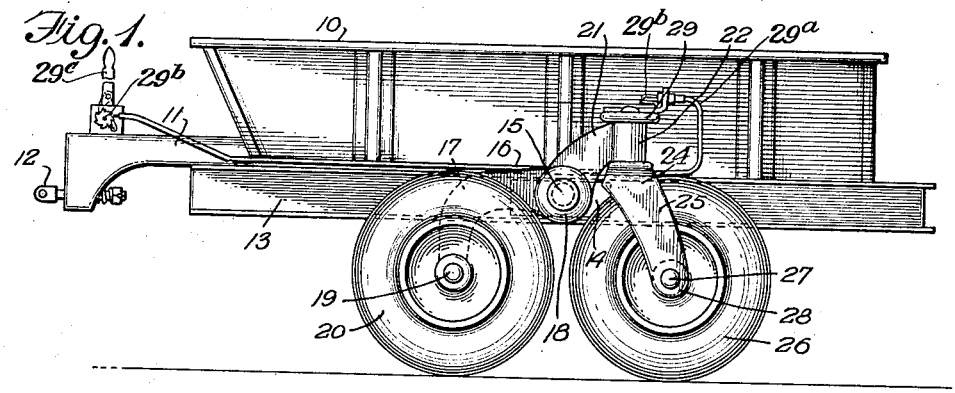
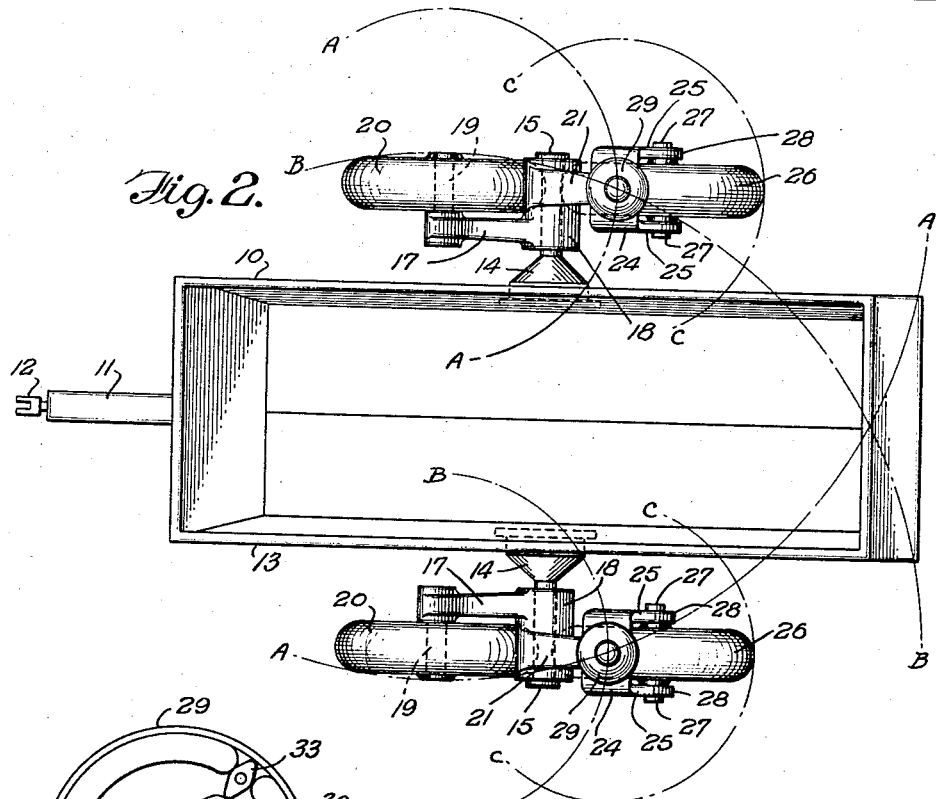
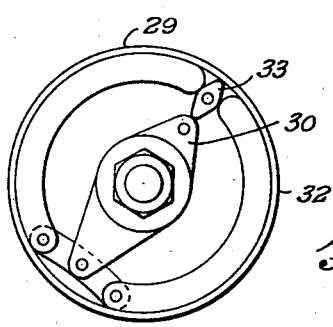
Inventor
EINAR H. ANDERSON.
By Harold C. Thorne
Attorney March 2, 1937.  E. H. ANDERSON  2,072,787
TANDEM WHEEL CHASSIS UNIT
Filed Feb. 1, 1933   3 Sheets-Sheet 2

Inventor
EINAR H. ANDERSON.

By Harold C. Thorne
Attorney

March 2, 1937.  E. H. ANDERSON  2,072,787
TANDEM WHEEL CHASSIS UNIT
Filed Feb. 1, 1933  3 Sheets-Sheet 3
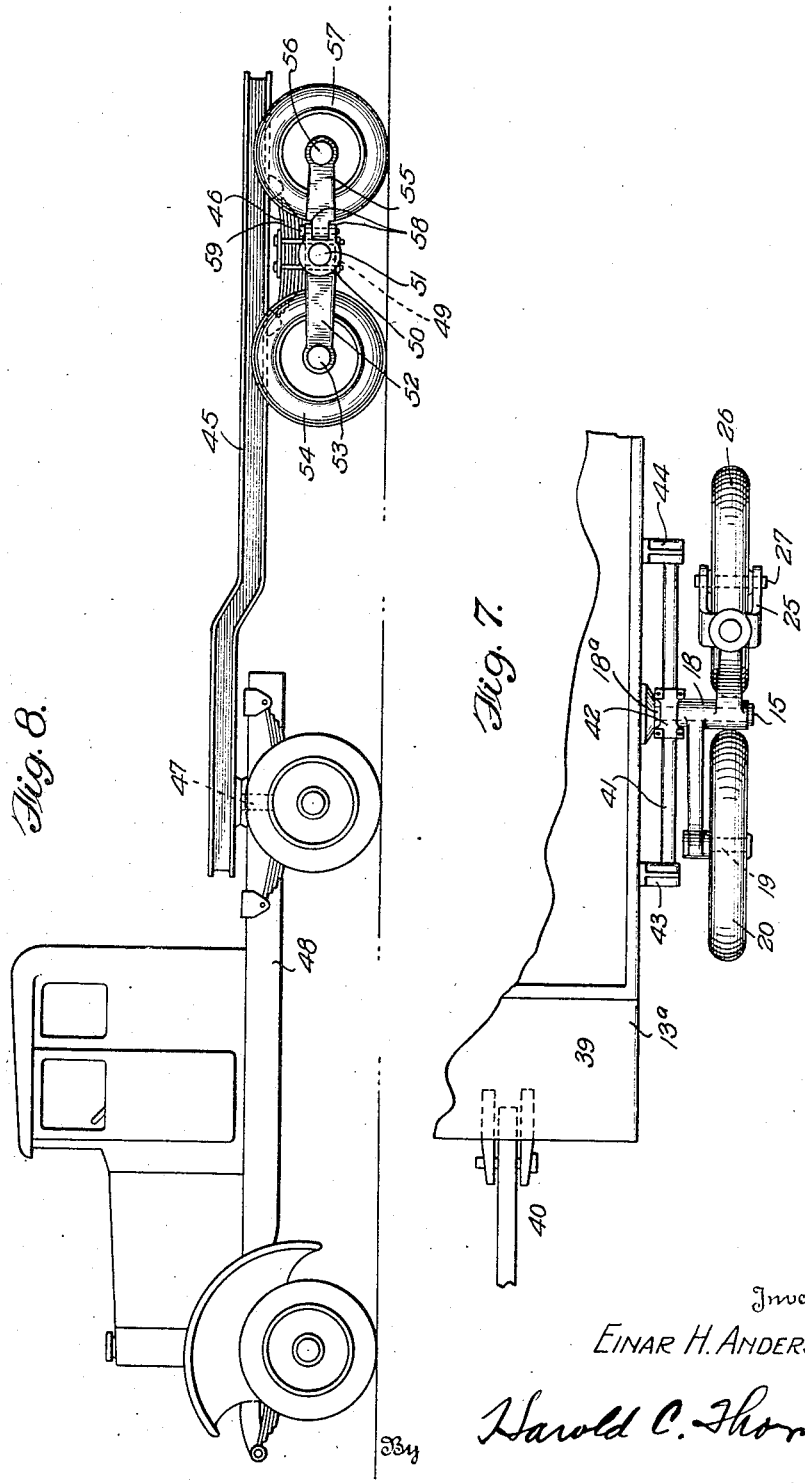
Inventor
EINAR H. ANDERSON.
By Harold C. Thorne
Attorney Patented Mar. 2, 1937

2,072,787

UNITED STATES PATENT OFFICE 2,072,787

TANDEM WHEEL CHASSIS UNIT

Einar H. Anderson, Chicago, Ill.

Application February 1, 1933, Serial No. 654,746

12 Claims. (Cl. 280—80)

This invention relates to tandem wheel chassis units for dump wagons or load carrying trailer units and the like.

Before the advent of the tractor into this field, horses and the common dump wagons were mostly used. With the entrance of the tractor, the same type of wagon in larger sizes pulled by the tractor were put into use. The longer wheelbase required in a large wagon of this design made it difficult to turn them in a narrow space, therefore to this line was later added an easily turned dump wagon with a single axle mounted in the center of the wagon and two large drum wheels mounted on the axle. This type of wagon was never very popular due to the fact that it required such a large diameter and wide wheel to get even the minimum requirement of bearing surface on the ground. Also the fact that the entire load is carried on a single axle made the wagon hard to pull especially on rougher ground; this is due to the fact that it becomes necessary to practically lift the entire load vertically when riding over an obstruction, which, of course, was objectionable even though the cost of the equipment was low.

In the latest type wagon and the one now most commonly used, the wagon proper is of the same design as the one described above. However, instead of the large wheels, it is equipped with crawlers. These give more ground contact under all conditions, and are supposed to pull easier, due to the fact that the crawler rocks on a central axle and therefore does not have to elevate the entire load at once when passing over an obstruction as is the case with the large wheel type wagon referred to above. Such crawler types of dump wagons as have been in general use have disadvantages in that the first cost is high and also the cost of maintenance is high since the average life of these crawlers has been about 2500 miles under ordinary loads and speeds. The length of haul on which they can be used is limited due to the limit of speed with which they can be transported,—two miles per hour maximum under load without extreme wear and tear. Further they are heavy making an additional dead weight, approximately 4000 pounds more than the construction in accordance with the present invention,—consequently less pay load.

Both crawler track and wheel equipped wagons of this type are also subject to scuffing or unnatural wear on their traction surfaces when making square turns which occur frequently particularly with large equipment and tractor drawn trailers or dump wagons. An object of this invention is to provide means for overcoming these difficulties particularly in wheel equipped dump wagons by providing chassis equipment which will enable the user to make square turns with the wagon without any such scuffing or unnatural wear on the tires, and the wheels thereof are preferably equipped with pneumatic tires which allows for additional speed at which the equipment may be drawn even with heavy loads as tractors are now designed for operation at continually increasing speeds in response to the demand for faster travel of such equipment.

My invention relates to a chassis design particularly for use on dump wagons such as just described and in accordance therewith a rocking beam is mounted on the single axle mounted in the center of the wagon, on which are mounted two sets of wheels—tandem wheels—instead of one set of large drum type wheels or crawler sets. The use of the rocking beam cuts down the resistance of the wagon on rough ground due to the fact that it is necessary to elevate the load only half the distance of the obstructions in passing over them. The resistance is further reduced through the use of pneumatic tires, the obstructions deflecting the tire rather than elevating the load. These features provide for a very low rolling resistance.

In order to effect short turns, required in a unit of this type, without destruction to the chassis, or scuffing and excessive wear on the tires, as would be the case if the rear wheel on the beam did not caster, the wheel on one end of each rocking beam is mounted to permit them to caster when turning. On the swivel stub axle of such casters is mounted a brake and sufficient pressure can be exerted on this brake to positively lock the wheels in any position when backing up the vehicle; a slight pressure on the brake operates to steady the castered wheels when traveling forward at high speed, yet will not prevent the caster action when making turns as required.

Inasmuch as the wagon proper is mounted on a single axle, or as shown and hereinafter specifically described,—two stub axles,—there is naturally a tendency for one end or the other to drop to the ground when it is not attached to the tractor. To eliminate this, I have provided a set of springs to be mounted on the rocking beams, one on each side. A set of brackets extend from the wagon proper contacting with each end of these springs. While this will maintain the body in a horizontal position, the flexibility of the springs will not eliminate the rocking action of the rocking beams.

Further objects and advantages of the invention will appear in the following detail description in conjunction with the accompanying drawings in which:—

Figure 1 is a side elevation of a tractor drawn type of dump wagon equipped with chassis elements in accordance with my invention.

Figure 2 is a plan view thereof.

Figure 4 is an enlarged detail plan view of a brake mechanism mounted on the caster member of the assembly.

Figure 7 is a fragmentary plan view thereof, and

Figure 8 is a side elevation showing a modified form of my tandem unit for use on trucks or semi-trailers.

Figure 5:
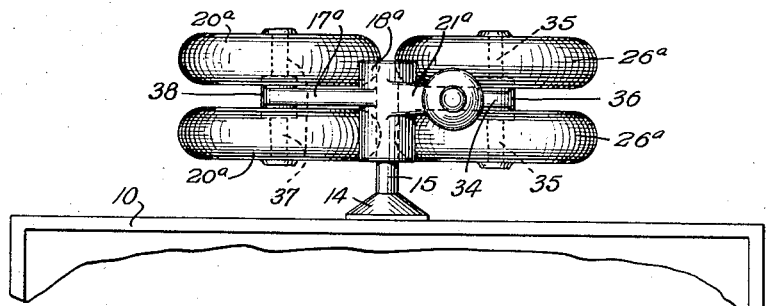
Figure 5 is a fragmentary plan view showing one side of such a dump wagon the chassis of which is equipped with dual pneumatic tires.

Referring to the drawings the tractor type of dump wagon is generally designated by the numeral 10. This vehicle is provided with a traction beam 11 and suitable connecting means 12 for coupling the wagon to a tractor or other draft appliance as desired. The lower frame of the wagon is designated 13; the wagon is equipped with any desired type of dumping mechanism and other parts which are not shown or specifically referred to hereinafter.

The chassis elements include bracket members 14 secured on the sides of frame 13 at approximately midway thereof and each of these bracket members has a laterally outwardly extending stub axle 15 providing a pivot for a rocking beam 16, one beam being mounted at each side of the wagon. Front arms 17 of these rocking beams are mounted adjacent to the inner end of the pivot hubs or bearings 18 thereof and the forward lower ends of these arms are provided with laterally outwardly extending stub axles 19 upon which the front wheels 20 are journaled. Rear arms 21 are mounted adjacent to the outer ends of pivot hubs or bearings 18 and extend rearwardly upward therefrom. The rear upper ends of these arms are formed with bearings 22 normally in a vertical position, and in these bearings are journaled pivots 23 extending upward from the caster members 24. Caster members 24 each have a pair of downwardly extending forks 25, in the lower ends each pair of which is journaled a rear wheel 26 on axles 27 either mounted in or journaled in bearings members 28 of the fork members.

This chassis structure with the two sets of tandem wheels (one set at each side) will enable the user to make a square turn with the vehicle without any scuffing or unnatural wear on the wheel tires. Assuming such a turn is to be made, the center of the turn will be substantially under one or the other of the front wheels and the small arcs A and B with such points as their centers will represent the path of the castering wheel nearest the center of the turn and the larger arcs A and B indicate the path of the castered wheel on the opposite side of the wagon. Arcs C indicate the arc of the castering wheels with respect to their pivots as centers, and the intersections of arcs C with arcs A and B indicate the extreme angles of castering required for the sharpest turns made. It will be seen that while the caster wheels approach the vehicle body the manner in which the tandem sets are mounted prevents them from coming under or close enough to the body for them to engage with it which would be the case if they were to come under it when the vehicle was turning on rough ground for which the vehicle is adapted. Naturally, this arrangement of the tandem wheels will also be an advantage on making any turn as well as enabling the making of square or sharp turns.

In order to hold the castered wheels in alignment with the front wheels when backing and also to assist in maintaining a straight track of the castered wheels when traveling forward a brake 29 is mounted on each caster arm 21 of the rocking beam for holding the caster wheel. A brake of the form shown in Figure 4 is suitable, consisting of an arm 30 mounted on each caster pivot 23 and carrying at its outer end a pair of brake shoes 31 which cooperate with a brake drum 32 mounted on the caster arm of the rocking beam. Brake shoes are expanded by a cam 33 which may be either hydraulically or mechanically operated from any desired point, as for example in the draft vehicle (not shown) as indicated, in Figure 1, a conventional "bender brake cable" for operating the brake 29 as shown consisting of a flexible steel tubing 29a extending from the brake and thence along the vehicle frame, and housing a sliding cable 29b providing a connecting means between the brake operating cam 33 and a brake operating lever 29c which may be positioned, if desired, on the traction beam 11.

In using the brakes the brake shoes can be operated with sufficient pressure so as to positively lock the caster wheels in any desired position when backing or with a slight pressure which operates to steady the castered wheels when traveling forward, and yet not prevent them from acting as casters when making a sharp turn with the machine so as to eliminate scuffing or excessive wear on the tires. This light braking action is an advantage in the forward movement of the machine particularly when traveling over rough ground.

The tandem wheels 20 and 26 are preferably equipped with large size pneumatic tires, as shown, which facilitates in the pulling of the vehicle at high speeds as is becoming essential. In Figure 5 a slight modification of the tandem wheel arrangement is shown in which dual pneumatic tired wheels 20a and 26a are shown. While in principle the rocking beam and castering wheels are the same the arrangement of the beam arms are modified, both the front arms 17a and rear arms 21a being mounted midway on the pivoting hub or bearing 18a and the wheels 20a and 26a are mounted on opposite sides of the respective arms. The castering member is in the form of an arm 34 instead of fork members and the wheels 26a are journaled or mounted on a stub axle 35 which extends laterally in both directions from the member 36 at the lower end of castering arm 34. Wheels 20a are similarly positioned on a stub axle 37 extending through the mounting 38 on the lower forward end of front arm 17a.

A chassis equipped with a pair of such dual-pneumatic wheels operates similarly to the arrangement already described but it has an advantage in affording an arrangement whereby the rocking beam tandem wheel structure may be equipped with dual wheels where the vehicle is to carry extremely heavy loads. It is further to be noted that in both arrangements the axles of the front and rear wheels of each set of tandem wheels are arranged quite close and the load supporting areas are concentrated midway of the dump wagons illustrated.

Figure 3:
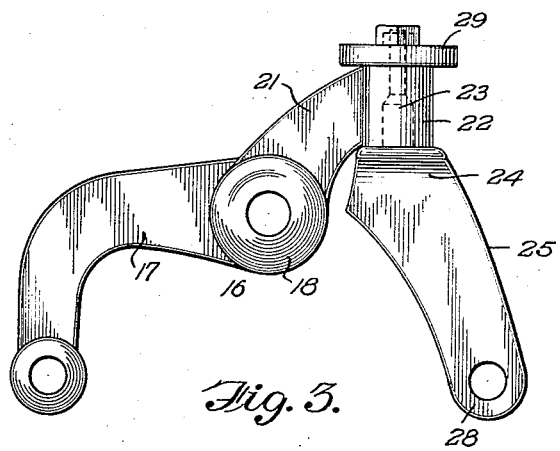
Figure 3 is an enlarged detail elevation of a rocking beam and caster assembly of the chassis unit shown in Figures 1 and 2.
Figure 6:
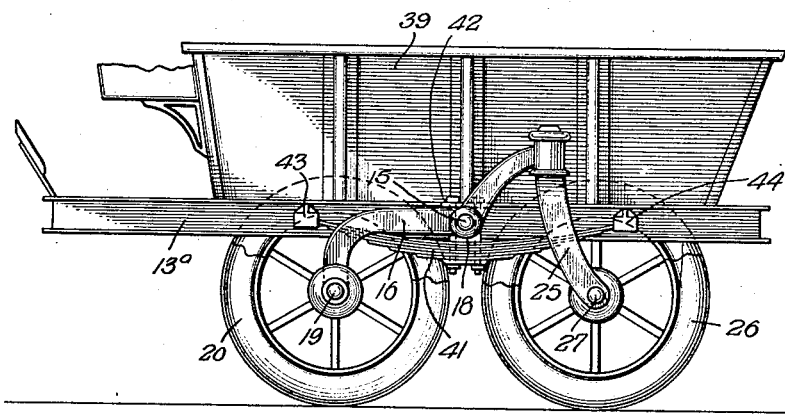
Figure 6 is a side elevation showing a portion of a horse drawn type of dump wagon having chassis elements in accordance with my invention.

In Figures 6 and 7 an application of such a square turn chassis unit is shown applied to a horse drawn dump wagon 39 some of the various parts of which are illustrated in these figures, but only a portion of the draft equipment generally indicated by the reference numeral 40. The elements of the tandem wheel units, rocking beams, castering members, wheels, etc. are shown generally in the same arrangement as the corresponding members in Figures 1, 2, 3 and 4, but may be of somewhat lighter construction. They are given the same characters of reference and will not be described again in detail except for changes in some of the details. Referring to Figure 7 it will be noted that the stub axles 15 are a little longer in proportion than these stub axles shown in Figures 1, 2 and 3 and that bearing members or hubs 18 are similarly longer having portions 18a extending inwardly from the front arms 17. These inward extensions 18a of the hubs afford portions to which springs 41, shown preferably as a multiple leaf spring, are secured by bolt and clamp members 42, (the spring on one side only being shown in the drawings since on the other side the spring is arranged in the same manner). As shown, springs 41 extend forwardly and rearwardly from hub portions 18a and their respective ends are secured to or engage front and rear brackets 43 and 44 mounted on the frame 13a of the dump wagon so as to extend laterally outward therefrom.

While dump wagon shown in Figures 6 and 7 operates the same in its movement and in turning, as herein previously set forth, the spring 41 provided in this arrangement operates to maintain the body of the vehicle or machine in a horizontal position when it is not attached to a tractor. This spring is also especially necessary on a wagon adapted for use with horses, in order to take the unsprung weight off the wagon tongue (the draft equipment).

Figure 8 shows a modified type of the tandem unit for use on trucks or semi-trailers such as the one shown the frame of which is designated 45. The swiveling arrangement on this type of the unit is somewhat different due to the spring suspension 46 and other parts in the chassis mountings which are characteristic features of such trucks. As indicated the forward extension of frame 45 has any suitable type of fifth wheel connection 47 with the rear of a truck 48 or other form of draft appliance.

In this form of the tandem unit a crosswise extending axle or bar 49, as shown, is secured by clamps 50 to the suspension springs 46. The outer end of axle or bar 49 has outwardly extending stub axles or journal members 51 upon which the rocking beams pivot. These rocking beams as shown, each consists of a forwardly extending arm 52 preferably forked and having a front axle 53 upon which the front tandem wheel 54 is journaled. The rear pivoting arm 55 is also shown as a forked member having a rear axle 56 for the rear tandem wheel 57. The front end of arm 55 is pivotally secured to extensions 58 of the rocking beam integral with the front arm 52 but to the rear of axle or journal member 51 by means of a vertical pivot member 59.

It will be seen that while this construction has the same general characteristics of trailers of this type it has in addition the improved feature in accordance with my invention which renders it capable of making extremely sharp turns without damage to the tires or chassis as referred to hereinbefore. Of course in this construction as shown the suspension springs do not have the same function as springs 41 of Figures 6 and 7 but perform the usual function in such arrangements.

While in some instances it may be desirable to arrange the front wheels of the tandem sets so as to caster instead of the rear wheels, as shown, it is preferable to have the trailing rear wheels caster in view of the operation of the chassis construction as described.

In addition to the advantages herein specifically set forth the tandem wheel chassis arrangement in accordance with my invention has other obvious advantages which will appear to those skilled in the art in view of the disclosures herein and the claims which follow.

While the invention as herein disclosed is primarily a chassis attachment for use on dump wagons in the dirt moving field, it is understood, that its use is in no way limited to this field, but that it is readily adaptable to any type trailer or truck where the vehicle load is distributed over tandem wheels, and together with short turning radius and other features, is desired. It will also be readily understood that many modifications may be made in the construction of the parts without departing from the present invention.

Having fully described my invention, I claim:

1. A tandem wheel chassis unit for land vehicles including, a set of tandem wheels, a rocking beam and means for pivotally mounting it on the side of a vehicle, a mounting for one of the wheels of the tandem set on said beam for holding the wheel so as to track substantially in a line parallel to the side of the vehicle, a caster mounting on said beam for the other of the wheels of the tandem set permitting said wheel to independently swivel with respect to the first said wheel, and means for operating on said caster mounting for restricting its swiveling.

2. A tandem wheel chassis unit for land vehicles including, a set of tandem wheels, a rocking beam and means for pivotally mounting it on the side of a vehicle, a mounting for one of the wheels of the tandem set on said beam for holding the wheel so as to track substantially in a line parallel to the side of the vehicle, a caster mounting on said beam for the other of the wheels of the tandem set permitting said wheel to independently swivel with respect to the first said wheel, and means for operating on said caster mounting for restricting its swiveling or holding it straight or at an angle with respect to the first said wheel.

3. A tandem wheel chassis unit comprising a rocking beam, an axle for pivotally mounting said beam on a vehicle, said beam having a forwardly extending front arm, a laterally extending axle adjacent to the outer end of said front arm, said beam also having an upwardly extending rear arm, a castering member pivoted to said rear arm and extending downwardly therefrom, said castering member having a laterally extending axle adjacent to its lower end, and wheels of substantially the same size and of equal load carrying capacities mounted on each of said two axles in a close tandem relationship with respect to each other with the pivot of the castering member above the periphery of the wheel mounted thereon, said front arm maintaining its wheel so as to track substantially in a line parallel with the side of the vehicle and said castering member permitting its wheel to swivel independently with respect to the front wheel.

4. A tandem wheel chassis unit in accordance with claim 3 in which the rocking beam is mounted on the axle extending outwardly from the vehicle by means of a bearing or hub journaled thereon from which the front and rear arms extend, and a connection between the rocking beam hub and the vehicle for holding the vehicle in a normal horizontal position but yieldable to permit the tandem wheel unit and vehicle to rock with respect to each other when passing over rough ground.

5. A tandem wheel chassis unit in accordance with claim 3, in which the rocking beam is mounted on the axle by means of a longitudinal bearing or hub journaled on the axle extending outward from a vehicle and the front and rear arms thereof extend from the outer portion of the hub, and a longitudinal spring also secured to said hub between said arms and inner end of the hub so that it will extend forwardly and rearwardly therefrom, with its ends arranged to cooperate to the vehicle for holding the vehicle in a normal horizontal position but yieldable to permit the tandem wheel unit and vehicle to rock with respect to each other when passing over rough ground.

6. A tandem wheel chassis unit in accordance with claim 3 in which dual pneumatic tired wheels of substantially the same size and of equal load carrying capacities are mounted on the axles of the front arm and the castering member.

7. A tandem wheel chassis unit comprising a rocking beam, an axle for pivotally mounting said beam on a vehicle, said beam having a forwardly extending front arm, a laterally extending axle adjacent to the outer end of said front arm, said beam also having an upwardly extending rear arm, a castering member pivoted to said rear arm and extending downwardly therefrom, said castering member having a laterally extending axle adjacent to its lower end, wheels of substantially the same size and of equal load carrying capacities mounted on each of said two axles in a close tandem relationship with respect to each other with the pivot of the castering member above the periphery of the wheel mounted thereon, said front arm maintaining its wheel so as to track substantially in a line parallel with the side of the vehicle and said castering member permitting its wheel to swivel independently with respect to the front wheel, and means above said rear arm of the rocking beam for operating on said castering member to restrict its swiveling movement.

8. A four wheel land vehicle including in combination, vehicle running gear consisting of a tandem set of wheels of substantially the same size at each side of the vehicle as the supporting means therefor, said tandem wheel sets each including a beam laterally pivoted to the vehicle at a midway position of the main load supporting portion of the vehicle, a mounting on each beam for a wheel of each tandem set for holding them to track in lines parallel to the sides of the vehicle, caster mountings on the beams for the other two wheels permitting said wheels to independently swivel with respect to the first said wheels, said wheel mounting on the beams being such that vehicle load is substantially equally distributed on each of the four wheels and means for restricting the castering of the caster wheels.

9. Running gear for a dump wagon having a bottom type dump comprising, a stub axle extending laterally from each side of the wagon at a midway position thereof, a beam pivoted on each of said stud axles, a pair of tandem wheels on each side of the wagon, a pair of axles associated with each of said beams upon which the tandem wheels are journaled so that the load is substantially equally distributed on each of the four wheels, a spring also connecting each of the pivoted beams with the wagon for supporting the wagon in a normal horizontal position with respect to the tandem wheels, but yieldable to permit the beams thereof independently to rock with respect to the wagon, and means for restricting the castering of the caster wheels.

10. A dump wagon having a bottom type dump with a chassis having a beam with a set of substantially equal sized tandem wheels at a side thereof, a mounting on said beam for one of the wheels of the tandem set for holding the wheel so as to track substantially in a line parallel to the side of the chassis on which the tandem wheel set is mounted, and a caster mounting on said beam for the other of the wheels of the tandem set having its castering pivot above the periphery of the wheel permitting said wheel to independently swivel with respect to the first said wheel and the wheels to be in close tandem relationship, a stub axle on the dump wagon chassis extending laterally outward therefrom upon which said beam is pivotally mounted and in a spaced relationship from the sides of the vehicle so that the wagon chassis and beam can rock with respect to each other and when the dump wagon is making abrupt turns the caster wheels in their paths will be entirely out from under the dump wagon chassis, and means for restricting the castering of the caster wheels.

11. The combination with a dump wagon having axles extending laterally at each side and in a midway position thereof, a rocking beam on each axle and wheels of equal size and in close tandem relationship associated with each rocking beam, of a castering pivot above one wheel of each rocking beam providing its connection therewith whereby one wheel of each beam tandem wheel set is permitted to swivel while the other wheel of each beam tandem wheel set is maintained so as to track longitudinally of the vehicle, and means for restricting the free swiveling of castering wheels.

12. A dump wagon having a bottom type dump including, supporting means comprising a set of equal size tandem wheels at each side of the wagon, means for mounting each tandem wheel set to the side of the wagon whereby the tandem wheel sets rock with respect to the wagon and independently of each other, and casters for one of the tandem wheels at each side of the wagon so that the castering wheels can turn independently of each other and of the other two supporting wheels and the dump wagon can be operated over extremely rough ground and make sharp turns with ease and without scuffing of the wheels in turning, and means for restricting the castering of the caster wheels.

EINAR H. ANDERSON.